United States Patent Office 3,770,787
Patented Nov. 6, 1973

3,770,787
VINYL FERROCENE BUTADIENE COPOLYMER BURNING RATE CATALYST
Jimmy D. Burnett, Arab, Ala., assignor to the United States of America as represented by the Secretary of the Army
No Drawing. Original application Sept. 17, 1969, Ser. No. 858,896. Divided and this application July 19, 1971, Ser. No. 164,143
Int. Cl. C07f 15/02
U.S. Cl. 260—439 CY
3 Claims

ABSTRACT OF THE DISCLOSURE

Copolymers of vinyl ferrocene and butadiene are disclosed along with the procedure for preparation. The copolymers are useful as a burning rate catalyst and provide a means for introducing and maintaining a high catalyst concentration in solid propellants inasmuch as the copolymer containing the iron catalyst is capable of serving as the binder replacing part of the normally used binders in solid propellants. Also disclosed is a typical solid propellant composition utilizing the copolymers of this invention as a binder replacement and burning rate catalyst.

---

This application is a division of application Ser. No. 858,896, filed Sept. 17, 1969.

BACKGROUND OF THE INVENTION

The burning rates of solid propellant compositions are increased when various metal containing compounds are used in the compositions. Iron oxides and iron-containing additives such as vinyl ferrocene and n-butyl ferrocene have been used in solid propellants to promote their burning rates. The liquid iron compounds have been generally preferred to solid iron compounds because of the convenience in mixing and blending. The liquid iron compounds have provided some additional benefit as plasticizing agents. In the liquid state the ferrocenes have certain inherent disadvantages characteristic of any liquid additives; such disadvantages include loss by evaporation and/or migration from the propellant system wherein used. The propellant system may change considerably during long term storage as a result of a loss by evaporation and/or migration. The reliability of a propellant system may also change when such loss has occurred.

Since the vapor pressure of vinyl ferrocene would be lessened when changed to a form such as in a polymeric state, an approach to preventing loss by evaporation and/or migration would be to combine vinyl ferrocene with a polymeric binder. The problem of crystallization of vinyl ferrocene in the propellant composition when stored at low temperature would be also eliminated if the vinyl ferrocene resided as a part of a copolymer in a polymeric chain.

An object of this invention is to provide copolymers of vinyl ferrocene and butadiene which have no significant vapor pressure and which do not crystallize in the propellant when stored at relative low temperatures.

Another object is to provide vinyl ferrocene copolymers usable in propellant compositions as a replacement for the liquid ferrocene catalyst and as a replacement for part of the normally used binders.

A further object is to provide copolymers of vinyl ferrocene by a process whereby the iron content in the finished copolymers as well as the molecular weight of the copolymers are controllable.

SUMMARY OF THE INVENTION

Vinyl ferrocene and butadiene are copolymerized in an inert organic solvent (e.g., benzene, toluene, and the like) under redox conditions by a suitable catalyst (e.g., cyclohexanone peroxide) to provide, in 50 percent or better yield, a copolymer having a suitable iron content for use in propellants as a replacement for the burning rate catalyst thereof. The copolymers also have suitable molecular weights and binder properties for use as a partial replacement for the normally used binders of propellant compositions. A representative copolymer of this invention has an average molecular weight of about 860 and an iron content of about 10.2 percent. The representative copolymer is utilized in a composite propellant composition having additional ingredients comprised of carboxyterminated polybutadiene binder, ammonium perchlorate oxidizer, and aluminum metal fuel. The propellant having about 1 weight percent iron content showed a burning rate superior to propellants having an equal amount of iron content while in a propellant as n-butyl ferrocene and $Fe_2O_3$. Although a partial replacement of carboxyterminated binder was made by the vinyl ferrocene-butadiene copolymer, the physical properties of the propellant composition were maintained at a satisfactory level. The gain in benefit of having the catalyst widely distributed as part of the stable polymeric binder is a significant one since the propellant burning rate is higher at all pressures than the standards using n-butylferrocene and $Fe_2O_3$.

DESCRIPTION OF THE PREFERRED EMBODIMENTS

Copolymers of vinyl ferrocene and butadiene with controllable molecular weight and iron content are obtained in the following general manner. A three neck flask fitted with a stirrer, a cold finger, and dropping funnel is used. About 200 milliliters (ml.) of distilled water is added to the flask and the system is degassed by boiling. Then 4.75 ml. of a non-ionic surfactant, wetting agent (e.g., Triton 102 supplied by Rohm and Haas Co. is satisfactory), 15 ml. of benzene, 6.75 grams of vinyl ferrocene, 27 grams of butadiene, and 4.72 grams of ferrous sulfate are added at 0° C. Then cyclohexanone peroxide (5.75 grams of cyclohexanone peroxide in 40 milliliters of tetrahydrofuran solution of 0° C.) is added in increments, while the reaction mixture at 0° C. is agitated, for a period of time of about one hour. The reaction mixture is then poured into 800 cc. of $H_2O$, made acidic with HCl, and extracted 4 times with 300 ml. of benzene. The benzene layer is water washed, dried over $Na_2SO_4$ and aspirated. The crude polymer is then obtained in 50 percent or better yield. Further purification is accomplished by pumping at 2 mm. Hg and 130° C. in a commercial sublimator for three days to remove (by sublimation) remaining traces of vinyl ferrocene. The polymer is soluble in most organic solvents. The molecular weight in the run described above is about 860 when measured on a vapor pressure osmometer. The percentage of the Fe in the polymer is 10.2%. The infrared spectrum contains bands for a relatively free carboxylic acid group (3400 cm.$^{-1}$ and 1620$^{-1}$), CH stretching both below and above 3000 cm.$^{-1}$ indicating aliphatic and cyclopentadienyl rings are present, a band at 965 cm.$^{-1}$ which in addition to absorption in the 1600 cm.$^{-1}$ region provides some support of the presence of trans double bands. A large band at 825 cm.$^{-1}$ is commonly found in ferrocene compounds. In common with other monosubstituted ferrocene compounds, bands are present at 100 cm.$^{-1}$ and 1000 cm.$^{-1}$.

On the basis of the percent Fe and the numerical average molecular weight of the polymer, calculations indicate that about 6.2 butadiene molecules are present for every molecule of vinyl ferrocene in the average molecule.

The product specified above shows an intrinic viscosity in dichloroethane of 0.0014. The polymer is fractionated by column chromatography on alumina and the eluted fractions have infrared spectra identical to the crude polymer.

The ferrous sulfate provides a reducing material for the reactions which proceed under redox conditions whereby the peroxide catalyst (e.g., cyclohexanone peroxide) is reduced and serves to terminate the chain of the polymers formed. Although the exact structure of the vinyl ferrocene butadiene copolymers are not known conclusively, the copolymers of this invention include cyclohexanone peroxide chain termination. The general representative structure for the cyclohexanone peroxide chain terminated copolymer of vinyl ferrocene and butadiene is illustrated as follows:

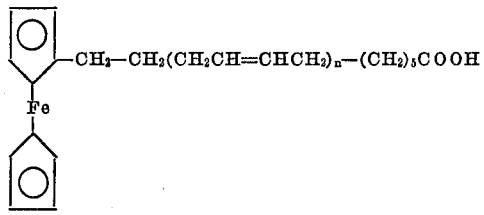

$n = 1, 2, 3 \ldots$

Burning rate studies have been made with the polymers of this invention on propellants comprised of carboxy-terminated polybutadiene (CTPB) binder, powdered aluminum metal fuel, and ammonium perchlorate oxidizer. A typical propellant sample (No. 1) set forth below using vinyl ferrocene-butadiene copolymer is compared with a standard propellant (No. 2), using n-butyl ferrocene (NBF), and a propellant sample (No. 3), using $Fe_2O_3$ as the catalyst.

PROPELLANT SAMPLES

|  | No. 1, wt. percent | No. 2, wt. percent | No. 3, wt. percent |
|---|---|---|---|
| Ap | 68.40 | 68.40 | 68.40 |
| Al | 14.00 | 14.00 | 14.00 |
| CTPB (binder) | 7.80 | 13.30 | 16.17 |
| 1% Fe | [1] 9.80 | [2] 4.30 | [3] 1.43 |
| Total | 100.00 | 100.00 | 100.00 |

[1] VF-CTPB (polymer).
[2] NBF.
[3] $Fe_2O_3$.

The burning rates of samples No. 1, No. 2, and No. 3, each containing the equivalent weight of specified material to yield 1% Fe, are set forth below.

| Sample Number | Burning rates at pressures of— | | |
|---|---|---|---|
|  | 1,500 p.s.i. | 1,000 p.s.i. | 500 p.s.i. |
| 1 [1] Fe as polymer, in./sec | 1.15 | 0.965 | 0.73 |
| 2 [1] Fe in NBF, in./sec | 1.05 | 0.91 | 0.69 |
| 3 [1] Fe as $Fe_2O_3$, in./sec | 0.74 | 0.60 | 0.44 |

[1] 1% by wt. Fe.

The process of this invention is carried out in a suitable container which is subjected to a controlled environment for maintaining the predetermined reaction temperature, for preventing loss of volatile components, and for providing agitation to maintain uniformity and mixing of reactant with reaction mixture to produce polymers of controlled molecular weights and iron contents. A predetermined reaction temperature and time, concentration, and rate of peroxide addition will permit many desirable combinations to yield the desired products. One can vary the reaction temperature, the rate of catalyst addition, the weight ratio of butadiene to vinyl ferrocene, and the total amount of cyclohexanone peroxide or other suitable organic peroxide catalyst and reactant added to produce copolymers having wide molecular weight ranges and total percentages of iron. A higher reaction temperature yields lower molecular weights at same catalyst addition rate. At same temperature, a slower catalyst addition rate yields a higher molecular weight polymer. The molecular weight range of polymers obtained by the process conditions set forth hereinabove is from about 400 to about 2,000 with an average of about 860.

When a ratio of butadiene (4) to vinyl ferrocene (1) is used, a polymer of about 10.2 weight percent iron is obtained. Thus, a dilution of the described polymer of about 10 to 1 in the propellant mix, provides about 1% Fe content. A ratio of about 6 parts butadiene to about 1 part vinyl ferrocene would yield a polymer of less iron content, assuming other conditions were maintained. It follows that the quantity of this copolymer could be increased when used in the propellant samples as above to provide the desired iron content in the finished propellant, and a higher percent of the binder could be replaced with the copolymer specified.

Other inert organic solvents with properties similar to benzene are usable with the process of this invention. Other lower oxidation states of metallic salts such as bivalent metallic salts of nickel or cobalt can be used in place of ferrous sulfate. Other organic peroxides such as cumene hydroperoxide or tert-butyl hydroperoxide can be employed as the catalyst and chain terminator in the process of this invention. The organic peroxides in a compatible solvent (e.g., tetrahydrofuran) are preferably added over a predetermined period of time to obtain the desired product having controlled iron content and molecular weight.

The wetting agent should be a non-ionic surfactant based on alkylaryl polyether alcohols whose surface activity includes wetting and emulsification and is suitable for use in polymer manufacture.

The suitable container adapted for receiving the reactants, should also be adapted with a cooling means to maintain the predetermined reaction temperature selected for obtaining desired molecular weight. The container should be equipped with a means suitable for preventing loss of volatile components such as butadiene from the reaction container during the reaction phase. A cold finger, (e.g., a cold column), such as one packed with Dry Ice whose function would be similar to a reflux apparatus whereby volatile components are condensed and returned to the reaction mitxure, works very well for the described function. The container should be equipped with agitation means during reaction to distribute the reactant within reaction mixture and maintain uniformity of concentrations, temperatures, etc.

The vinyl ferrocene-butadiene copolymers of this invention may be used in the propellant composition in an amount from about 5 weight percent to about 25 weight percent. The remaining propellant ingredients exclusive of processing aids (such as lecithin and trace amount of additives) may be comprised of carboxyterminated polybutadiene binder, plasticizer, a metal fuel such as aluminum, and an inorganic oxidizer such as ammonium perchlorate.

Since the burning rate of a propellant increases as the iron content increases, optimum amounts of iron content can be controlled at least two ways. The amount of vinyl ferrocene copolymerized with butadiene as well as the amount of copolymer selected for use in formulations are two ways whereby the desired iron content, burning rate, and physical properties may be optimized.

Those skilled in the art will recognize that other propellant ingredients may be varied to include metal additives other than aluminum in amount from about 5 to about 20 weight percent, inorganic oxidizer such as ammonium perchlorate from about 10 to about 72 weight percent. Plasticizers (e.g., non-volatile organic liquids or low melting point solids such as phthalic, adipate, and sebacate esters and aryl phosphate esters) may be selected for use with the copolymers of this invention. Plasticizer content is determined by the desirable properties required for a propellant formulation. Generally, plasticizer amount from about 5 to about 30 weight percent is satisfactory. Since the copolymers of this invention are easily blended with the remaining binder and other ingredients no additional plasticizer is required in most instances. Special curing agents and trace amount of additives known in the art for their specific contribution to the ballistic, castibility, and storage properties of the propellant may be added to the propellant formulation without interfering with the functions of the vinyl ferrocene-butadiene copolymers.

We claim:

1. The carboxyterminated-copolymers of vinyl ferrocene and butadiene characterized by having a controlled iron content and molecular weight, said copolymers being formed in a reaction mixture by the process which comprises combining a predetermined weight ratio of vinyl ferrocene and butadiene, a lower oxidation state metallic salt selected from the bivalent metallic salts of iron, nickel, and cobalt, a suitable non-ionic surfactant, and an inert organic solvent selected from benzene and toluene; containing said reaction mixture in a suitable container that is subjected to a controlled environment for maintaining a predetermined temperature of said reaction mixture during the reaction phase when said copolymers are formed and for preventing loss of volatile components from said reaction mixture; agitating said reaction mixture during said reaction phase; adding in increments to said reaction mixture over a predetermined period of time a reactant selected from cyclohexanone peroxide, cumene hydroperoxide, and tert-butyl hydroperoxide, and which is contained in a compatible solvent, to thereby form said copolymers; and thereafter separating said copolymers.

2. The copolymers prepared in accordance with the process of claim 1 and wherein said suitable non-ionic surfactant is present in an amount of about 4.75 milliliters, said inert organic solvent is benzene in an amount of about 15 milliliters, said predetermined weight ratio is about 6.75 grams of vinyl ferrocene to about 27 grams of butadiene, said lower oxidation state metallic salt is ferrous sulfate in an amount of about 4.72 grams; said reactant is cyclohexanone peroxide in the amount of about 5.75 grams contained in about 40 milliliters of the compatible solvent, said compatible solvent being tetrahydrofuran, and said predetermined period of time for adding said reactant to said reaction mixture is about one hour while a predetermined temperature of reaction mixture and reactant is maintained at about 0° C.

3. The copolymers of claim 2 and wherein said copolymers are characterized by having a controlled iron content of about 10.2 weight percent and by having a controlled molecular weight range from about 400 to about 2000 with an average molecular weight of about 860.

References Cited

UNITED STATES PATENTS 3,447,981  6/1969  Sayles _____ 149—19

OTHER REFERENCES

Arimoto et al.: J. Am. Chem. Soc., 77, 6295–7.
Baldwin et al.: J. Polymer Science, Part A–1, 5, 2091–8.
Pittman: J. Polymer Science, Part B, 6, 19–21.

CARL D. QUARFORTH, Primary Examiner

E. A. MILLER, Assistant Examiner

U.S. Cl. XR.

260—82.1